US012666335B2

(12) United States Patent (10) Patent No.: US 12,666,335 B2
Wang et al. (45) Date of Patent: Jun. 23, 2026

(54) TERMINAL DEVICE(S), NETWORK DEVICE(S), COMPUTER READABLE MEDIA, AND METHODS FOR STORING SUCCESSFUL HANDOVER INFORMATION

(71) Applicant: NEC CORPORATION, Tokyo (JP)

(72) Inventors: Da Wang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 328 days.

(21) Appl. No.: 18/269,045

(22) PCT Filed: Dec. 31, 2020

(86) PCT No.: PCT/CN2020/142488
§ 371 (c)(1),
(2) Date: Jun. 22, 2023

(87) PCT Pub. No.: WO2022/141563
PCT Pub. Date: Jul. 7, 2022

(65) Prior Publication Data
US 2024/0049098 A1 Feb. 8, 2024

(51) Int. Cl.
*H04W 36/36* (2009.01)
*H04W 36/00* (2009.01)
*H04W 36/18* (2009.01)

(52) U.S. Cl.
CPC ..... *H04W 36/362* (2023.05); *H04W 36/0072* (2013.01); *H04W 36/0083* (2013.01); *H04W 36/18* (2013.01)

(58) Field of Classification Search
CPC ............. H04W 24/02; H04W 36/0066; H04W 36/0072; H04W 36/0083; H04W 36/18; H04W 36/305; H04W 36/362
See application file for complete search history.

(56) References Cited

U.S. PATENT DOCUMENTS

2013/0150023 A1* 6/2013 Kim ..................... H04W 36/322
455/423
2019/0053109 A1* 2/2019 Tambaram Kailasam ...................
H04W 24/10
(Continued)

FOREIGN PATENT DOCUMENTS

JP 2011-188188 A 9/2011
WO 2020/166015 A1 8/2020
(Continued)

OTHER PUBLICATIONS

"Successful Handover Report"; Qualcomm; 3GPP TSG-RAN WG2 Meeting #112-e R2-2009397 Electronic, Nov. 2-13, 2020 (Year: 2020).*

(Continued)

*Primary Examiner* — Benjamin H Elliott, IV

(57) ABSTRACT

Embodiments of the present disclosure provide a solution for supporting a successful handover report. In a method for communication, a terminal device receives, from a first network device providing a first cell, an indication that a handover of the terminal device from the first cell to a second cell of a second network device is to be performed. Then, the terminal device determines triggering information about a successful handover report of the handover based on a set of triggering conditions. The triggering information indicates whether the successful handover report is triggered for the handover. In this way, the successful handover report can be optionally triggered based on the set of triggering conditions, so that the terminal device may be limited to reporting a successful handover report when necessary, thereby saving processing resources and communication resources for unnecessary successful handover reports.

4 Claims, 8 Drawing Sheets

(56) References Cited

U.S. PATENT DOCUMENTS

| | | | | |
|---|---|---|---|---|
| 2020/0260347 | A1* | 8/2020 | Xu | H04W 88/06 |
| 2022/0110180 | A1 | 4/2022 | Jung et al. | |
| 2022/0141725 | A1* | 5/2022 | Parichehrehteroujeni | H04W 36/00837 |
| | | | | 370/331 |
| 2023/0086398 | A1* | 3/2023 | Teyeb | H04W 76/19 |
| 2023/0164866 | A1* | 5/2023 | Chang | H04W 76/38 |
| | | | | 370/329 |
| 2023/0180330 | A1* | 6/2023 | Chang | H04W 76/34 |
| | | | | 370/329 |
| 2023/0189092 | A1* | 6/2023 | Wang | H04W 76/19 |
| | | | | 370/331 |
| 2023/0189112 | A1* | 6/2023 | Wu | H04W 36/00837 |
| | | | | 455/437 |
| 2023/0397080 | A1* | 12/2023 | Parichehrehteroujeni | H04W 36/08 |
| 2024/0049098 | A1* | 2/2024 | Wang | H04W 36/0083 |
| 2024/0334266 | A1* | 10/2024 | Wu | H04W 88/02 |

FOREIGN PATENT DOCUMENTS

| | | | |
|---|---|---|---|
| WO | 2020/167012 | A1 | 8/2020 |
| WO | 2020/167237 | A1 | 8/2020 |
| WO | 2022/086381 | A1 | 4/2022 |

OTHER PUBLICATIONS

Huawei," RAN impact on 3-byte TAC for LTE to NR Handover", 3GPP TSG-RAN3 Meeting #102, R3-186961, Nov. 21-16, 2018,(3 pages).

Japanese Office Action dated Oct. 22, 2024 in Application No. 2023-539997.

"Discussion on successful handover report", NTTDocomo, Inc., 3GPP TSG-RAN WG2 #112-e, R2-2010459, Nov. 13, 2020, pp. 1-4.

International Search Report for PCT/CN2020/142488 dated Sep. 29, 2021.

Written Opinion for PCT/CN2020/142488 dated Sep. 29, 2021.

Lenovo et al., "MRO Enhancement for fast MCG link recovery", 3GPP TSG-RAN WG2 Meeting #112e, R2-2009850, Nov. 2-13, 2020, 2 pages.

CATT, "Discussion on Mobility Robust Optimization in 5G system", 3GPP TSG-RAN WG3 #103bis, R3-192126, Apr. 8-12, 2019, 6 pages.

Ericsson, "Summary of AI 8.13.2.3—Other WID related SON features", 3GPP TSG-RAN WG2 #111-e, R2-2010996, Nov. 2-13, 2020, 24 pages.

Extended European Search Report dated Mar. 10, 2025 in application No. 20967901.8.

JP Office Action for JP Application No. 2025-021303, mailed on Dec. 2, 2025 with English Translation.

* cited by examiner

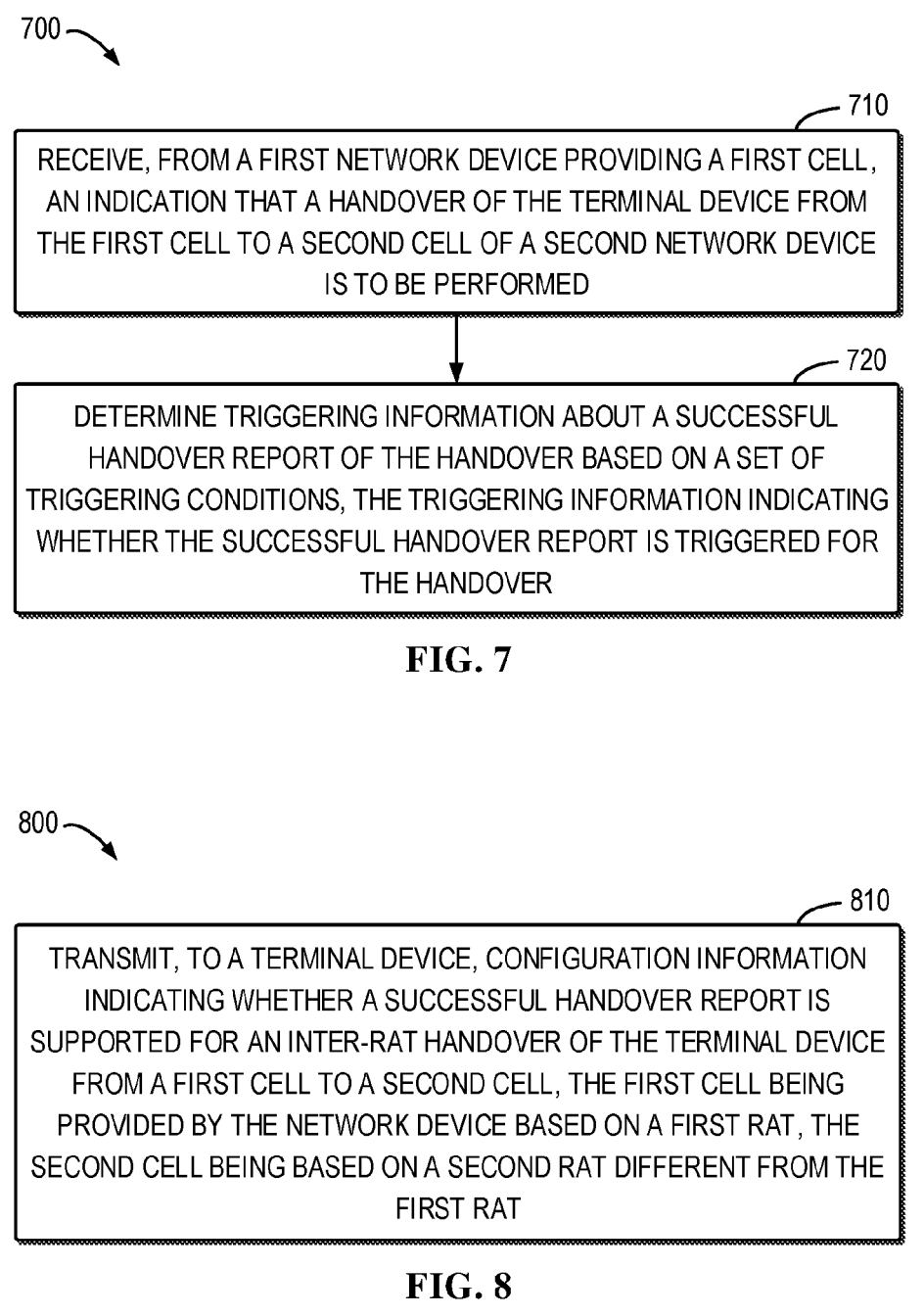

700

710

RECEIVE, FROM A FIRST NETWORK DEVICE PROVIDING A FIRST CELL, AN INDICATION THAT A HANDOVER OF THE TERMINAL DEVICE FROM THE FIRST CELL TO A SECOND CELL OF A SECOND NETWORK DEVICE IS TO BE PERFORMED

720

DETERMINE TRIGGERING INFORMATION ABOUT A SUCCESSFUL HANDOVER REPORT OF THE HANDOVER BASED ON A SET OF TRIGGERING CONDITIONS, THE TRIGGERING INFORMATION INDICATING WHETHER THE SUCCESSFUL HANDOVER REPORT IS TRIGGERED FOR THE HANDOVER

TRANSMIT, TO A TERMINAL DEVICE, CONFIGURATION INFORMATION INDICATING WHETHER A SUCCESSFUL HANDOVER REPORT IS SUPPORTED FOR AN INTER-RAT HANDOVER OF THE TERMINAL DEVICE FROM A FIRST CELL TO A SECOND CELL, THE FIRST CELL BEING PROVIDED BY THE NETWORK DEVICE BASED ON A FIRST RAT, THE SECOND CELL BEING BASED ON A SECOND RAT DIFFERENT FROM THE FIRST RAT

FIG. 8

TERMINAL DEVICE(S), NETWORK DEVICE(S), COMPUTER READABLE MEDIA, AND METHODS FOR STORING SUCCESSFUL HANDOVER INFORMATION

CROSS REFERENCE TO RELATED APPLICATIONS

This application is a National Stage of International Application No. PCT/CN2020/142488 filed Dec. 31, 2020.

FIELD

Embodiments of the present disclosure generally relate to the field of communication, and more particularly, to a solution for supporting a successful handover report.

BACKGROUND

5G New Radio (NR) is the global standard for a unified and more capable 5G wireless air interface. 5G enables a new kind of network that is designed to connect virtually everyone and everything together including machines, objects, and devices. In the 3rd Generation Partnership Project (3GPP) Release 17 (Rel-17) Work Item Description (WID) Enhancement of data collection for Self-Optimizing Networks (SON)/Minimization of drive tests (MDT) in NR, the objectives for SON feature are the following: support of data collection for SON features, including Coverage and Capacity Optimization (CCO), inter-system inter-radio access technology (RAT) energy saving, inter-system load balancing, 2-step Random Access Channel (RACH) optimization, mobility enhancement optimization, and leftovers of Rel-16 SON/MDT Work Item (WI), for example, successful handovers reports.

With regard to the successful handovers reports, it is identified that the Mobility Robustness Optimization (MRO) function in NR could be enhanced to provide a more robust mobility via reporting failure events observed during successful handovers. A solution to this problem is to configure User Equipment (UE) to compile a report associated to a successful handover comprising a set of measurements collected during the handover phase, such as a measurement at the handover trigger, a measurement at the end of handover execution or measurement after handover execution, or the like. However, generating of such a report for each successful handover would introduce unnecessary waste of resources.

SUMMARY

In general, embodiments of the present disclosure provide a solution for supporting a successful handover report.

In a first aspect, there is provided a method for communication. The method comprises receiving, at a terminal device from a first network device providing a first cell, an indication that a handover of the terminal device from the first cell to a second cell of a second network device is to be performed. The method also comprises determining triggering information about a successful handover report of the handover based on a set of triggering conditions. The triggering information indicates whether the successful handover report is triggered for the handover.

In a second aspect, there is provided a method for communication. The method comprises transmitting, at a network device to a terminal device, configuration information indicating whether a successful handover report is supported for an inter-RAT handover of the terminal device from a first cell to a second cell. The first cell is provided by the network device based on a first RAT, and the second cell is based on a second RAT different from the first RAT.

In a third aspect, there is provided a terminal device. The terminal device comprises a processor configured to perform the method according to the first aspect.

In a fourth aspect, there is provided a network device. The network device comprises a processor configured to perform the method according to the second aspect.

In a fifth aspect, there is provided a computer readable medium having instructions stored thereon. The instructions, when executed on at least one processor of a device, cause the device to perform the method according to the first aspect.

In a sixth aspect, there is provided a computer readable medium having instructions stored thereon. The instructions, when executed on at least one processor of a device, cause the device to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 7 illustrates a flowchart of an example communication method in accordance with some embodiments of the present disclosure;

FIG. 8 illustrates a flowchart of another example communication method in accordance with some embodiments of the present disclosure.

Throughout the drawings, the same or similar reference numerals represent the same or similar elements.

DETAILED DESCRIPTION OF EMBODIMENTS

Figure 1A:
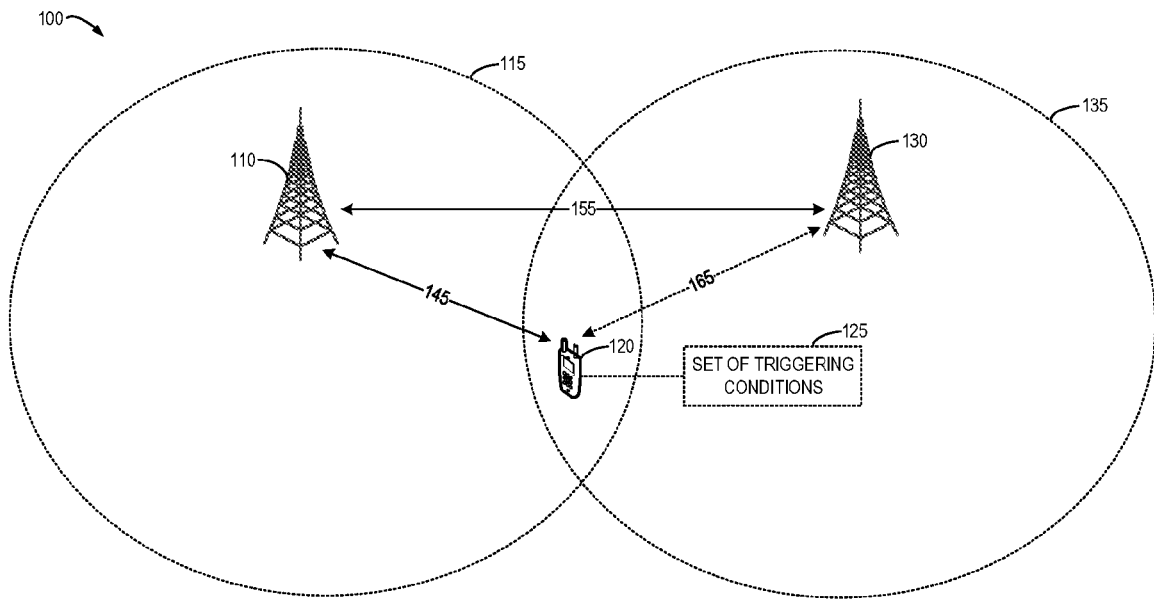
FIG. 1A illustrates a schematic diagram of a communication environment in which some embodiments of the present disclosure can be implemented.

Principles of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can perform communications. Examples of a network device include, but not limited to, a Node B (NodeB or NB), an Evolved NodeB (eNodeB or eNB), a next generation NodeB (gNB), an infrastructure device for a V2X (vehicle-to-everything) communication, a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Every-thing (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

In some embodiments, a terminal device may be connected with a first network device and a second network device. One of the first network device and the second network device may be a master node and the other one may be a secondary node. The first network device and the second network device may use different radio access technologies (RATs). In some embodiments, the first network device may be a first RAT device and the second network device may be a second RAT device. In some embodiments, the first RAT device is an eNB and the second RAT device is a gNB. Information related to different RATs may be transmitted to the terminal device from at least one of the first network device and the second network device. In some embodiments, first information may be transmitted to the terminal device from the first network device and second information may be transmitted to the terminal device from the second network device directly or via the first network device. In some embodiments, information related to configuration for the terminal device configured by the second network device may be transmitted from the second network device via the first network device. Information related to reconfiguration for the terminal device configured by the second network device may be transmitted to the terminal device from the second network device directly or via the first network device.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory (memories) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the term "transmission reception point," "transmission/reception point," or "transmission and reception point" may generally indicate a station communicating with the user equipment. However, the transmission and reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission and reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission and reception point, the base station (BS), and/or the cell may include a variety of coverage areas such as a mega-cell, a macro-cell, a micro-cell, a pico-cell, a femto-cell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present disclosure, and may not be limited to a specific term or word. As used herein, an uplink (UL) transmission/reception is a scheme in which data is transmitted from user equipment to a base station. Alternatively, a downlink (DL) transmission/reception is a scheme in which data is transmitted from the base station to the user equipment.

As used herein, the term "resource," "transmission resource," "resource block," "physical resource block," "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some embodiments of the present disclosure. It is noted that embodiments of the present disclosure are equally applicable to other resources in other domains.

As used herein, the singular forms "a," "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As mentioned above, in the 3GPP Rel-17 WID Enhancement of data collection for SON/MDT in NR, one of the objectives for SON feature is the successful handover reports. A successful handover report generally refers to a report of a successful handover of a terminal device from a source cell to a target cell. In particular, the successful handover report can be generated by the terminal device performing the successful handover, transmitted by the terminal device to a target network device of the target cell or a subsequent network device serving the terminal device if the target network device does not obtain the successful handover report, and finally obtained by a source network device of the source cell from the target network device or the subsequent network device.

Based on the successful handover report provided by the terminal device, the source network device and/or the target network device can further optimize future handover procedures to be initiated in the source cell or to be targeted to the target cell, even if the previous handover performed by the reporting terminal device is successful. In this way, the performance of the future handovers can be further improved. For example, upon reception of the successful handover report, the receiving network device (for example, the source or target network device) is able to analyze whether its mobility configuration needs adjustments. Such adjustments may result in changes of mobility configurations, such as changes of radio link monitoring (RLM) configurations or changes of mobility thresholds between the source network device and the target network device. In addition, the target network device may further optimize the dedicated RACH-beam resources based on the beam measurements reported upon successful handovers.

However, in conventional solutions of the successful handover reports, various details of the successful handover reports have not been specified and need to be clarified. As an example, generating of such a successful handover report for each successful handover may be unnecessary. Thus, it may be desirable that a successful handover report can be optionally or selectively generated for a successful handover that needs to be improved. In fact, the specific mechanism for supporting successful handover reports is not clear and needs to be determined. In addition, it is now still unclear as to how to exactly configure the successful handover reports, and it is noted that the conventional solutions of the successful handover reports do not consider new features introduced by Rel-16.

In order to solve the above technical problems and potentially other technical problems in the conventional solutions, embodiments of the present disclosure provide a solution for supporting a successful handover report. In some embodiments, a terminal device receives an indication from a first network device providing a first cell. The indication indicates that a handover of the terminal device from the first cell to a second cell of a second network device is to be performed. Then, the terminal device determines triggering information about a successful handover report of the handover based on a set of triggering conditions. The triggering information indicates whether the successful handover report is triggered for the handover.

With the embodiments of the present disclosure, the terminal device can be configured with the set of triggering conditions to optionally compile the successful handover report of the handover, and hence the successful handover report may be triggered only if one or more of the set of triggering conditions are met. This may limit the terminal device to reporting to relevant successful handover cases, such as underlying issues detected by RLM, Beam failure detection (BFD), or the like before or during a successful handover event. In other words, the successful handover report can be optionally triggered based on the set of triggering conditions, so that the terminal device may be limited to reporting a successful handover report when necessary, thereby saving processing resources and communication resources for unnecessary successful handover reports. Principles and implementations of the present disclosure will be described in detail below.

FIG. 1A illustrates a schematic diagram of a communication environment 100 in which some embodiments of the present disclosure can be implemented. As shown in FIG. 1A, the communication environment 100, which may also be referred to as a communication network 100 or a communication system 100, includes a network device 110 serving a terminal device 120 located in a cell 115 provided by the network device 110. In particular, the terminal device 120 may communicate with the network device 110 in the cell 115 via a communication link 145. For transmissions from the network device 110 to the terminal device 120, the communication link 145 may be referred to as a downlink, whereas for transmissions from the terminal device 120 to the network device 110, the communication link 145 may alternatively be referred to as an uplink.

In the example scenario as shown in FIG. 1A, the terminal device 120 may be leaving the cell 115 of the network device 110 and entering into a cell 135 of a network device 130, due to the mobility of the terminal device 120. In this event, the quality of the link 145 from the terminal device 120 to the cell 115 may be reduced, and thus the communication quality of the terminal device 120 may also be lowered. For providing the terminal device 120 with a better communication quality, the network device 110 can cause the terminal device 120 to perform a handover from the cell 115 to the cell 135. Through the handover, the terminal device 120 may release the link 145 to the cell 115 and instead establish a link 165 to the cell 135. For the handover from the cell 115 to the cell 135, the cell 115 may also be referred to as a source cell, the network device 110 may also be referred to as a source network device, the cell 135 may also be referred to as a target cell, and the network device 130 may also be referred to as a target network device.

More specifically, the handover may be performed by the terminal device 120 in a connected mode in which the terminal device 120 is active. The handover can be controlled by the source network device 110 and assisted by the terminal device 120. Before the handover, the terminal device 120 may transmit to the source network device 110 one or more measurement reports that the link 145 to the source cell 115 is getting degraded and/or the target cell 135 is getting better than the source cell 115. Based on these measurement reports, the network device 110 may possibly move (namely, hand over) the connection of the terminal device 120 from the source cell 115 to the target cell 135, so the terminal device 120 can get better radio conditions and consequently a better user experience.

During the handover of the terminal device 120 from the source cell 115 to the target cell 135, the source network device 110 can communicate necessary information for facilitating the handover with the target network device 130 via a communication link 155, such as an Xn interface between the two network devices. In addition, it is to be appreciated that although the handover of the terminal device 120 from the source cell 115 to the target cell 135 is described above as being due to the movement of the terminal device 120, embodiments of the present disclosure is not limited thereto and may be applicable to handovers caused by various possible reasons.

In some embodiments, the terminal device 120 can generate a successful handover report if the handover from the source cell 115 to the target cell 135 is successful. The availability of the successful handover report may be indicated by a message (for example, a Handover Complete message, such as RRCReconfigurationComplete) transmitted from the terminal device 120 to the target network device 130 over radio resource control (RRC) layer. The target network device 130 may fetch the information in the successful handover report via a UE Information Request and Response mechanism. In addition, the target network device 130 may then forward the successful handover report to the source network device 110 to indicate failures experienced during a successful handover event.

Based on the successful handover report provided by the terminal device 120, the source network device 110 and/or the target network device 130 can further improve future handover procedures to be initiated in the source cell 115 or to be targeted to the target cell 135, even if the previous handover performed by the reporting terminal device 120 is successful. For example, upon reception of the successful handover report, the source network device 110 and/or the target network device 130 may be able to analyze whether its mobility configuration needs adjustments. Such adjustments may result in changes of RLM configurations, changes of mobility thresholds between the source and the target, and so on.

In some embodiments, since a main purpose of the successful handover reports is to help the network devices in improving future handovers related to the source and target network devices, it may be unnecessary for a terminal device to generate a successful handover report for each successful handover. Instead, it may be desirable for a terminal device to selectively or optionally generate a successful handover report for a handover that may need to be improved. To this end, as shown in FIG. 1A, the terminal device 120 can be configured with a set of triggering conditions 125 for triggering a successful handover report. In this way, the successful handover report can be triggered only if one or more of the set of triggering conditions 125 are met. Accordingly, the terminal device 120 may be limited to reporting a successful handover report when necessary, thereby saving processing resources and communication resources for unnecessary successful handover reports.

It is noted that the handover of the terminal device 120 from the cell 115 to the cell 135 as discussed above with reference to FIG. 1A may be referred to as an inter-network-device handover, in which the source cell 115 and the target cell 135 are provided by different network devices 110 and 130. However, it should be understood that in addition to such an inter-network-device handover, embodiments of the present disclosure are also applicable to an intra-network-device handover, in which the source cell 115 and the target cell 135 may be provided by a same network device. An example of such an intra-network-device handover will be described below with reference to FIG. 1B.

Figure 1B:
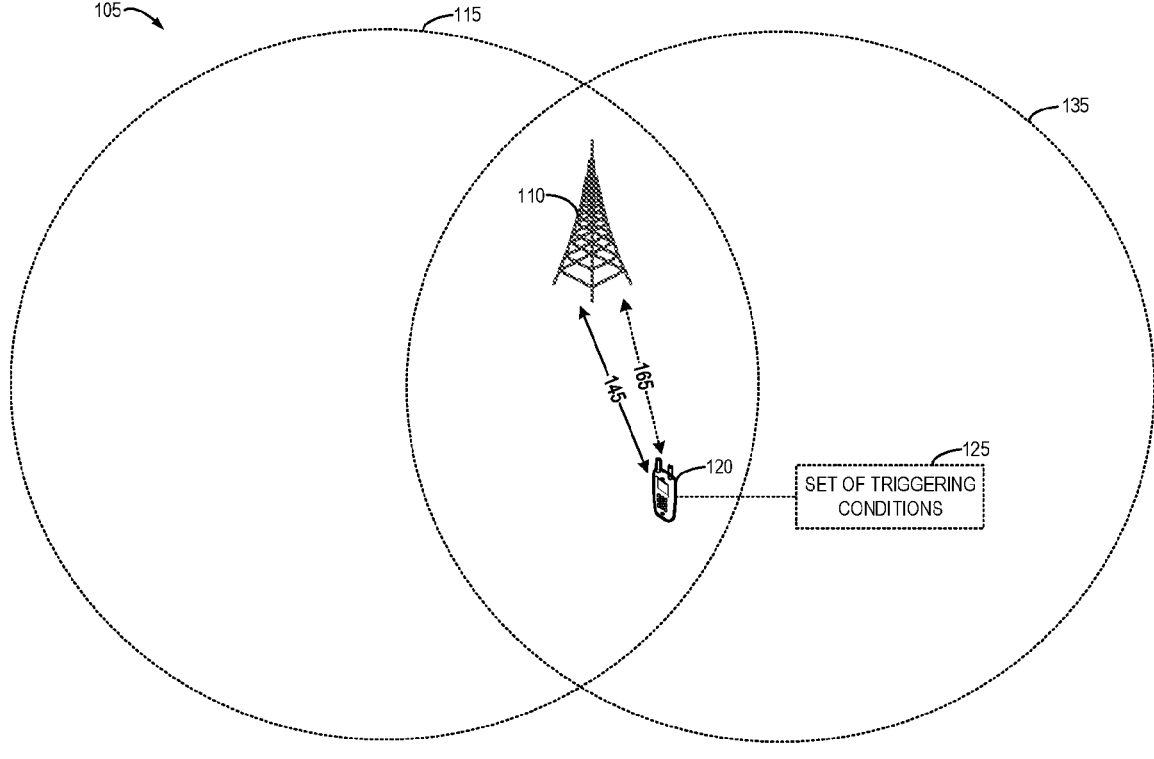
FIG. 1B illustrates a schematic diagram of another communication environment in which some embodiments of the present disclosure can be implemented.

FIG. 1B illustrates a schematic diagram of another communication environment 105 in which some embodiments of the present disclosure can be implemented. Similar to the example scenario of FIG. 1A, the network device 110 in the example scenario as shown in FIG. 1B also provides the cell 115 and the terminal device 120 may have the communication link 145 to the cell 115. Also similar to the example scenario of FIG. 1A, the terminal device 120 in the example scenario as shown in FIG. 1B can also perform a handover from the cell 115 to the cell 135, for example, due to the movement of the terminal device towards the cell 135. Through the handover, the terminal device 120 may release the link 145 to the source cell 115 and instead establish the link 165 to the target cell 135. Different from the example scenario of FIG. 1A, the target cell 135 in the example scenario as shown in FIG. 1B can also be provided by the same network device 110 providing the source cell 115, and thus the handover in FIG. 1B can be referred to as an intra-network-device handover.

The procedure of the intra-network-device handover performed by the terminal device 120 in FIG. 1B may be largely analogous to the inter-network-device handover as described above with reference to FIG. 1A, except that the communications between two network devices for facilitating the handover may not be needed. Similar to the example scenario of FIG. 1A, the terminal device 120 can also be configured with the set of triggering conditions 125 to generate a successful handover report of the intra-network-device handover in FIG. 1B. In this way, the successful handover report can be triggered only if one or more of the set of triggering conditions 125 are met. Accordingly, the terminal device 120 may be limited to reporting a successful handover report when necessary, thereby saving processing resources and communication resources for unnecessary successful handover reports. In the following description, some embodiments will be further detailed in connection with the example scenario of the inter-network-device handover as shown in FIG. 1A. However, it should be understood that all the embodiments can also be applied to the intra-network-device handover as shown in FIG. 1B, if applicable.

It is to be understood that the number of the terminal devices, the number of the network devices, the number of cells, and the number of communication links as shown in FIGS. 1A and 1B are only for the purpose of illustration without suggesting any limitations. The communication environment 100 or 105 may include any suitable number of terminal devices, any suitable number of network devices, any suitable number of other communication devices, any suitable number of cells, and any suitable number of communication links adapted for implementing embodiments of the present disclosure.

In addition, it is to be appreciated that there may be various wireless communications as well as wireline communications (if needed) among all the communication devices in FIGS. 1A and 1B. Moreover, it is noted that although the network device 110 and the network device 130 are schematically depicted as a base station and the terminal device 120 is schematically depicted as a mobile phone in FIGS. 1A and 1B, it is understood that these depictions are only for example without suggesting any limitation. In other embodiments, the network device 110 and the network device 130 may be any other wireless network device, and the terminal device 120 may be any other wireless communication device.

The communications in the communication environment 100 or 105 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
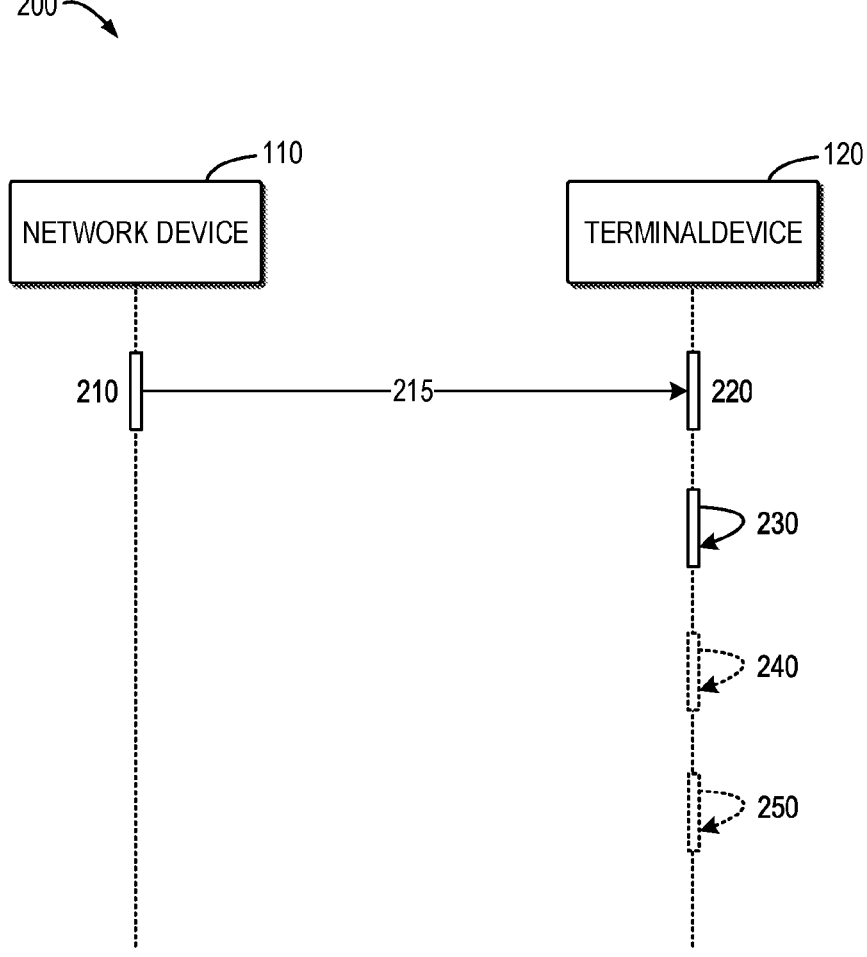
FIG. 2 illustrates an example communication process between a network device and a terminal device in accordance with some embodiments of the present disclosure.

FIG. 2 illustrates an example communication process 200 between the network device 110 and the terminal device 120 in accordance with some embodiments of the present disclosure. For the purpose of discussion, the communication process 200 will be described with reference to FIG. 1A. However, it would be appreciated that the communication process 200 may be equally applicable to any other communication scenarios where two communication devices communicate with each other.

As shown in FIG. 2, if the network device 110 determines that the handover of the terminal device 120 from the cell 115 to the cell 135 needs to be performed, the network device 110 transmits (210) an indication 215 to the terminal device 120. The indication 215 can indicate that the handover from the cell 115 to the cell 135 is to be performed by the terminal device 120. On the side of the terminal device 120, upon receiving (220) the indication 215 from the network device 110, the terminal device 120 determines (230) triggering information based on the set of triggering conditions 125. The triggering information is about a successful handover report of the handover and indicates whether the successful handover report is triggered for the handover or not.

In other words, based on the set of triggering conditions 125, the terminal device 120 can determine whether the successful handover report is to be generated for the handover indicated by the indication 215. For example, if one or more of the set of triggering conditions 125 are satisfied before or during the performing of the handover, the terminal device 120 may determine that the successful handover report is to be generated for the handover. On the other hand, if none of the set of triggering conditions 125 is satisfied before or during the performing of the handover, the terminal device 120 may alternatively determine that the successful handover report is not to be generated for the handover.

In general, the set of triggering conditions 125 can include any suitable triggering condition implying a successful but imperfect handover that may need to be improved. For example, the set of triggering conditions 125 may include a radio problem towards the source cell being detected prior to handover triggering, a RACH delay during handover procedure being detected, a quality change threshold being reached, an absolute quality threshold for the main measurement moments being reached, the handover being initiated during running of the timer T310/T312 as defined in the related 3GPP specifications, RRCReconfiguration being executed, and so on. In some embodiments, it would be desirable for the set of triggering conditions 125 to be more inclusive and comprehensive, so that the source network device 110 and/or the target network device 130 of the handover can obtain more useful information for improving future handovers. For example, one or more of the set of triggering conditions 125 may be designed in consideration of various new features introduced by Rel-16.

As an example of such comprehensive triggering conditions, the set of triggering conditions 125 may include a first type of triggering conditions related to a listen-before-talk (LBT) process performed by the terminal device 120. In New Radio in Unlicensed Spectrum (NR-U), channel accesses in both downlink and uplink rely on the LBT feature. For example, with reference to FIG. 1A, if the communication system 100 is implemented in NR-U, the network device 110 or the terminal device 120 must first "sense" a communication channel to find out there is no communications on the communication channel prior to any transmission on the communication channel. When a communication channel is a wide bandwidth unlicensed carrier (for example, several hundreds of MHz), the "channel sensing" procedure may rely on detecting the energy level on multiple sub-bands of the communication channel. The LBT parameters (such as type/duration, clear channel assessment parameters, and the like) can be configured in the terminal device 120 by the network device 110.

In connection with the LBT process, the related 3GPP specifications define an LBT failure and a consistent LBT failure as follows. If an LBT failure indication has been received from lower layers, the lbt-FailureDetectionTimer may be started or restarted and LBT_COUNTER may be incremented by 1. If LBT_COUNTER is greater than or equal to lbt-FailureInstanceMaxCount, a consistent LBT failure is triggered for the active UL BWP in this Serving Cell. If this Serving Cell is the SpCell, and if a consistent LBT failure has been triggered in all UL BWPs configured with PRACH occasions on the same carrier in this Serving Cell, a consistent LBT failure may be indicated to upper layers. If this Serving Cell is not the SpCell, any ongoing random access procedure in this Serving Cell may be stopped, the active UL BWP may be switched to an UL BWP, on the same carrier in this Serving Cell, configured with PRACH occasion and for which consistent LBT failure has not been triggered, and a random access procedure may be initiated. In addition, if a consistent LBT failure is triggered and not cancelled in the SpCell; and if the random access procedure is considered successfully completed in the SpCell, then all the triggered consistent LBT failure(s) may be cancelled in the SpCell. More details of the LBT failure and the consistent LBT failure can be found in the related 3GPP specifications.

In general, the first type of triggering conditions related to the LBT process may be any suitable triggering condition indicating a LBT process that may need to be improved. In some embodiments, the first type of triggering conditions may be related to LBT failure related information. In other words, the LBT failure related information can be considered as a triggering condition for a successful handover report.

As an example, a triggering condition of the first type may be that a consistent LBT failure in the LBT process is triggered and not canceled. A triggered and not cancelled consistent LBT failure may imply that the LBT failure recovery process performed by the terminal device 120 before or during the handover is suboptimal and can be improved by optimizing the handover. Therefore, through such a triggering condition regarding the consistent LBT failure, the terminal device 120 can be triggered to collect the information related to the handover and report the collected information to the source network device 110 via the target network device 120 or another serving network device of the terminal device 120. In this way, the source network device 110 can optimize a future handover procedure based on the successful handover report triggered by the triggering condition regarding the consistent LBT failure, and thereby avoiding a consistent LBT failure related to a terminal device in the cell 115 before the future handover.

As another example, a triggering condition of the first type may be that a LBT counter for counting the number of LBT failures in the LBT process is greater than a predetermined threshold. The number of LBT failures higher than the predetermined threshold can imply that there is one or more LBT failures occur in the LBT process performed by the terminal device 120 before or during the handover, and thus the handover process is suboptimal and can be improved by optimizing the handover related parameters. Therefore, through such a triggering condition regarding the LBT counter, the terminal device 120 can be triggered to collect the information related to the handover and report the collected information to the source network device 110 via the target network device 120 or another serving network device of the terminal device 120. In this way, the source network device 110 can optimize a future handover procedure based on the successful handover report triggered by the triggering condition regarding the LBT counter, and thereby avoiding one or more of LBT failures related to a terminal device in the cell 115 before the future handover.

In some embodiments, the LBT counter may be the "LBT_COUNTER" as defined in the related 3GPP specifications. In some other embodiments, the LBT counter can be any other existing or future LBT counter defined for a LBT process performed by a terminal device. In some embodiments, the predetermined threshold may be 1 and the triggering condition may be that the LBT counter is larger than or equal than 1, which means that there is an LBT failure in the LBT process. In some other embodiments, the predetermined threshold may be any suitable value other than 1, and the number of LBT failures higher than the predetermined threshold may indicate a more severe LBT problem in the LBT process.

As another example of the above-mentioned comprehensive triggering conditions, the set of triggering conditions 125 may include a second type of triggering conditions related to a fast master cell group (MCG) link recovery associated with the terminal device 120. The fast MCG link recovery may be performed by the terminal device 120 in a Dual Connectivity (DC) communication scheme. In the DC, user equipment (UE) is connected simultaneously to a Master Node (MN) and a Secondary Node (SN). The UE can be configured to operate in carrier aggregation (CA) with each node. The cells of the MN where the UE is operating in CA are referred to as the master cell group (MCG), while those of the SN are referred to as the secondary cell group (SCG).

Figure 3:
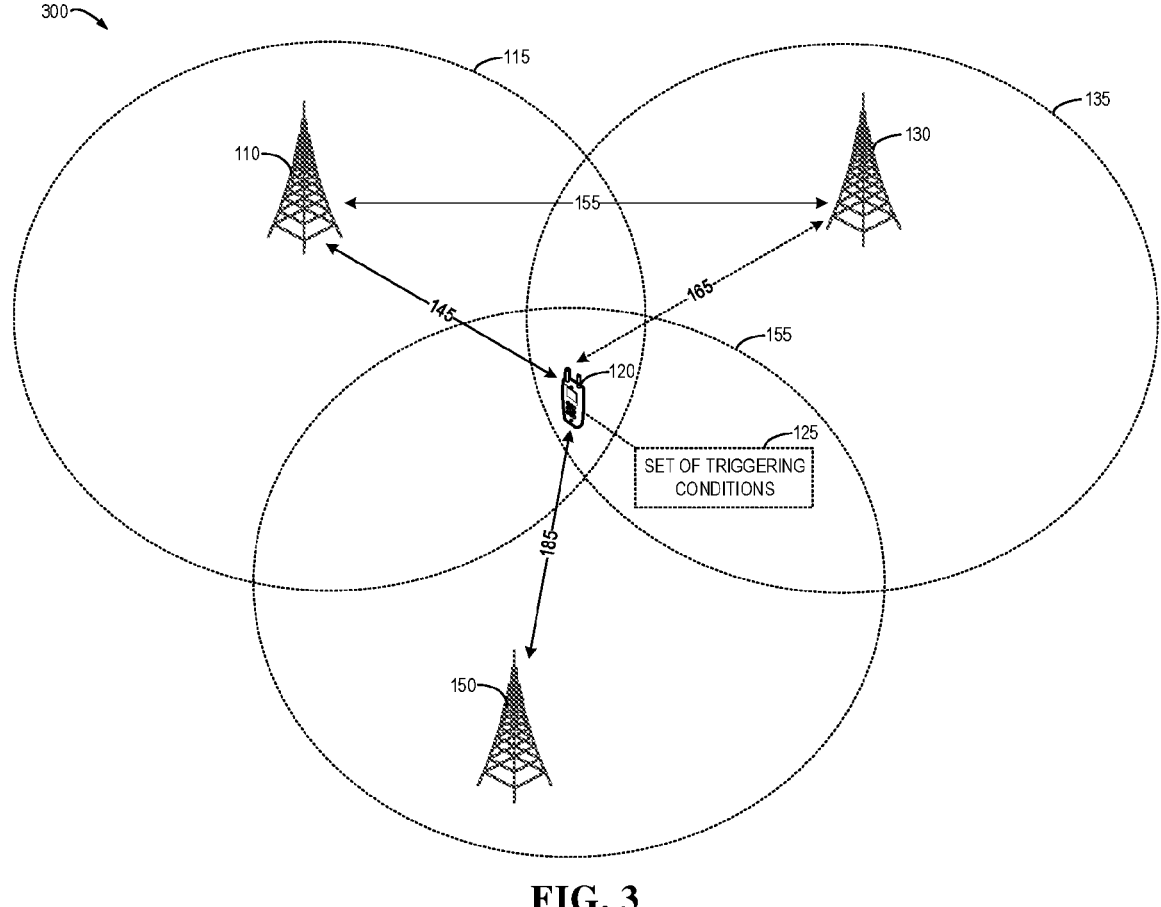
FIG. 3 illustrates a schematic diagram of a further communication environment in which some embodiments of the present disclosure can be implemented.

FIG. 3 illustrates a schematic diagram of a further communication environment 300 in which some embodiments of the present disclosure can be implemented. In the communication environment 300, it is assumed that a dual connectivity communication scheme is configured for the terminal device 120. In such a case, the network device 110 may be a master network device (or the Master Node) of the terminal device 120 and provide an MCG including the cell 115. In other words, the MCG provided by the master network device 110 consists of one or more cells including the cell 115. A network device 150 may be a secondary network device (or the Secondary Node) of the terminal device 120 and provide a SCG including a cell 155. That is, the SCG provided by the secondary network device 150 consists of one or more cells including the cell 155. With the dual connectivity communication scheme, in addition to the communication link 145 between the network device 110 and the terminal device 120, the terminal device 120 can simultaneously communicate with the network device 150 via a communication link 185. Other portions of the example scenario depicted in FIG. 3 are similar to the example scenario as shown in FIG. 1A, and thus the detailed description for these portions is omitted.

To improve signaling robustness, in some DC options, the UE may be configured with a split signaling Radio Bearer (SRB), which enables transmission of Radio Resource Control (RRC) signaling via the MCG and/or SCG. That is, Evolved Universal Terrestrial Radio Access (E-UTRA) or NR RRC messages such as RRC Reconfiguration can be sent using the MN and/or SN radio resources. Additionally, in some DC options, the UE may be configured with SRB3, which is an SRB terminated in the SN and used only for control signaling between the SN and UE (meaning where no coordination with the MN is required).

In addition, for some dual connectivity communication schemes, the fast MCG link recovery feature introduced in Rel-16 aims to decrease the connection interruption time during radio link failure (RLF). By utilizing the SCG connectivity, the interruption time caused by MCG RLF can be reduced from several seconds down to a typical handover interruption time of 30-70 ms. For end users, this directly translates into decreased service interruption times.

For example, a fast MCG recovery in Multi-RAT Dual Connectivity (MR-DC) refers to an RRC procedure where the UE sends an MCG Failure Information message to the MN via the SCG upon the detection of a radio link failure on the MCG. If a radio link failure is detected for MCG, and the fast MCG link recovery is configured, the UE may triggers the fast MCG link recovery. During the fast MCG link recovery, the UE can suspend MCG transmissions for all radio bearers and report the failure with MCG Failure Information message to the MN via the SCG, using the SCG leg of split SRB1 or SRB3.

Upon reception of the MCG Failure Indication, the MN can send RRC reconfiguration message or RRC release message to the UE via SCG, using the SCG leg of split SRB1 or SRB3. If the RRCReconfiguration message was received in response to the MCGFailureInformation message, the information included in VarRLF-Report may be cleared, if any. This means that in case of a successful fast MCG recovery through handover, the network may be unable to have the MCG failure information and thus loses an opportunity to avoid further MCG RLFs and improve the performance of the fast MCG recovery.

To address this potential defect in the handover in response to fast MCG recovery, a triggering condition of the second type may be that the terminal device 120 receives a radio resource control (RRC) reconfiguration message via the SCG provided by the network device 150. The RRC reconfiguration message may contain the indication 215 of the handover and is in response to MCG failure information transmitted by the terminal device 120 via the SCG to the network device 110. The MCG failure information may indicate an MCG radio link failure (RLF). More particularly, the triggering condition related to the MCG link recovery may be that the RRCReconfiguration (with reconfiguration-WithSync) is received in response to the MCGFailureInformation.

Such an RRC reconfiguration message received by the terminal device 120 may mean that the MCG for the terminal device 120 before or during the handover is sub-optimal and can be improved by optimizing the handover. Therefore, through such a triggering condition regarding the RRC reconfiguration message, the terminal device 120 can be triggered to collect the information related to the handover and report the collected information to the source network device 110 via the target network device 120 or another serving network device of the terminal device 120. In this way, the source network device 110 can optimize a future handover procedure based on the successful handover report triggered by the triggering condition regarding RRC reconfiguration message, and thereby avoiding a MCG failure related to a terminal device in the cell 115 before the future handover. More particularly, in case of a successful MCG recovery by handover, the MCG failure information can be reported by the terminal device 120, which can enable the network to analyze and enhance the performance of fast MCG recovery.

As another example of the above-mentioned comprehensive triggering conditions, the set of triggering conditions 125 may include a third type of triggering conditions if the handover is a dual active protocol stack (DAPS) handover. In general, a DAPS handover may refer to a handover procedure that maintains the source network device connection after reception of an RRC message for a handover and until releasing the source cell after successful random access to the target network device. In case of the DAPS handover, for RLF in the source cell, any data transmission or reception via the source link may be stopped and the source link may be released, but the source RRC configuration may be maintained.

For example, with reference to FIG. 1A, it is assumed that the handover of the terminal device 120 from the cell 115 to the cell 135 is a DAPS handover. Upon receiving the indication 215 (or a request) to perform the DAPS handover with reduced interruption time, the terminal device 120 may continue to send and receive user data in the source cell 115. At the same time, a new connection 165 to the target cell 135 can be established and the terminal device 120 may perform synchronization and random access in the target cell 135. The terminal device 120 can establish a new user plane protocol stack for the target cell 135, containing PHY (Physical), MAC (Medium Access Control) and RLC (Radio Link Control) layers, while keeping the source user plane protocol stack active for transmission and reception of user data in the source cell 115.

Accordingly, in the case of the DAPS handover from the cell 115 to the cell 135, if the terminal device 120 is configured with a triggering condition of the third type related to the DAPS handover, then the source network device 110 or the target network device 130 can improve future DAPS handovers related to the source cell 115 or the target cell 135. For example, if a source RLF happens during the DAPS handover, it may mean that 0ms handover interruption cannot be achieved by the DAPS handover. Therefore, it may be desirable for the terminal device 120 to trigger the successful handover report in response to the source RLF during the DAPS handover. To this end, in some embodiments, a triggering condition of the third type may be that an RLF on the source cell 115 is detected by the terminal device 120 in case of the DAPS handover (for example, any DAPS bearer is configured).

Through such a triggering condition regarding the RLF on the source cell 115 in the DAPS handover, the terminal device 120 can be triggered to collect the information related to the DAPS handover and report the collected information to the source network device 110 via the target network device 120 or another serving network device of the terminal device 120. In this way, the source network device 110 and/or the target network device 130 can improve future DAPS handover procedures related to the source cell 115 and/or the target cell 135 based on the successful handover report triggered by the triggering condition regarding the RLF on the source cell 115.

As another example of the above-mentioned comprehensive triggering conditions, the set of triggering conditions 125 may include a fourth type of triggering conditions if the handover is a conditional handover (CHO). The conditional handover is one of the main mobility enhancements specified by 3GPP in Rel-16, which focuses on reducing the number of failure occurrences while a terminal device is moving, for example, when a handover between cells fails, or when a connection fails even before a handover is triggered.

For example, with reference to FIG. 1A, it is assumed that the handover of the terminal device 120 from the cell 115 to the cell 135 is a conditional handover. In such a case, instead of preparing one target cell as in the normal case, multiple candidate target cells including the cell 135 can be prepared in advance in the network device 110. The network device 110 may enable the indication 215 (for example, a handover command) to be sent to the terminal device 120 earlier than at normal handover when the radio conditions are still good, rather than when conditions start to get degraded as in normal handover. When received the handover command, the terminal device 120 may store the handover command, instead of applying the handover command immediately. In fact, the terminal device 120 may only apply the stored handover command when a condition configured in the terminal device 120 is satisfied for one (for example, the cell 135 in the example scenario of FIG. 1A) of the configured candidate target cells, and then the terminal device 120 can execute the handover and connects to the target network device 130 as in a normal handover.

Accordingly, in the case of the conditional handover from the cell 115 to the cell 135, if the terminal device 120 is configured with a triggering condition of the fourth type related to the conditional handover, then the source network device 110 or the target network device 130 can improve future conditional handovers related to the source cell 115 or the target cell 135. For example, a triggering condition of the fourth type may be that multiple CHO candidate cells including the cell 135 are configured. Multiple configured CHO candidate cells may mean that more than one target cell are configured for the CHO. Therefore, through such a triggering condition regarding the multiple CHO candidate cells, the terminal device 120 can be triggered to collect the information related to the CHO with multiple candidate cells and report the collected information to the network device 110 via the target network device 120 or another serving network device of the terminal device 120. In this way, the source network device 110 and/or the target network device 130 can improve a future CHO with multiple candidate cells based on the successful handover report triggered by the triggering condition regarding the multiple CHO candidate cells.

As another example, a triggering condition of the fourth type may be that multiple (for example, two) execution conditions are configured for the target cell 135. Multiple configured execution conditions for the target cell 135 may mean that not all of the multiple execution conditions are fulfilled for the handover of the terminal device 120 to the target cell 135. Therefore, through such a triggering condition regarding the multiple execution conditions, the terminal device 120 can be triggered to collect the information related to the conditional handover and report the collected information to the network device 110 via the target network device 120 or another serving network device of the terminal device 120. In this way, the source network device 110 and/or the target network device 130 can improve a future conditional handover with configured execution conditions based on the successful handover report triggered by the triggering condition regarding the multiple execution conditions.

Referring back to FIG. 2, after determining (230) the triggering information based on the set of triggering conditions 125, the terminal device 120 may perform difference operations regarding the successful handover report based on the determined triggering information. In some embodiments, the terminal device 120 may determine that the successful handover report is triggered for the handover from the cell 115 to the cell 135. For example, the terminal device 120 may detect that one or more of the set of triggering conditions 125 are fulfilled before or during performing the handover. This means that the terminal device 120 may need to generate the successful handover report of the handover. To this end, before or during performing the handover from the cell 115 to the cell 135, the terminal device 120 can collect (240) information to be reported in the successful handover report. As such, the information to be reported in the successful handover report can be collected only if the successful handover report is triggered, thereby avoiding unnecessary collecting of the information for all the successful handovers.

On the other hand, the terminal device 120 may determine that the successful handover report is not triggered for the handover from the cell 115 to the cell 135. For example, the terminal device 120 may identify that none of the set of triggering conditions 125 is fulfilled before or during performing the handover. This means that there is no need for the terminal device 120 to generate the successful handover report of the handover. In this event, before or during performing the handover from the cell 115 to the cell 135, the terminal device 120 may avoid (250) collecting the information for the successful handover report. As such, the terminal device 120 may not collect the information to be reported in the successful handover report if the successful handover report is not triggered, thereby saving unnecessary overhead to collect the information for all the successful handovers.

In general, the successful handover report generated by the terminal device 120 can include any information that can be helpful for the source network device 110 or the target network device 130 to improve the performance of future handovers. For example, the information collected (240) by the terminal device 120 and to be contained in the successful handover report may include RLM related information, BFD related information, and handover related information, or the like. In some embodiments, it would be desirable for the content of the successful handover report to be more inclusive and comprehensive. Therefore, after receiving the informative successful handover report, the source network device 110 or the target network device 130 can obtain more useful information related to various aspects of the handover, so as to improve the performance of the future handovers more effectively and efficiently.

As an example, for the purpose of generating the successful handover report, the terminal device 120 can collect a first type of information related to a LBT process performed by the terminal device 120. In general, the first type of information may be any suitable information of the LBT process that can reflect problems in the LBT process. For example, LBT failure related information can be stored by the terminal device 120 as the content of the successful handover report and reported to the source network device 110. In this way, after receiving the successful handover report including the information related to the LBT process performed by the terminal device 120 before the handover, the source network device 110 can improve a future LBT process performed by a terminal device related to a handover initiated in the cell 115 by optimizing the configurations of the handover.

In some embodiments, the first type of information can be stored and reported by the terminal device 120 in the successful handover report, if one or more triggering conditions of the first type are satisfied before or during the handover of the terminal device 120. In other words, if the terminal device 120 detects a fulfilled triggering condition related to the LBT process before or during the handover, then the terminal device 120 may collect the information related to the LBT process to be included in the successful handover report. In this way, the information collected by the terminal device 120 for the successful handover report can be more targeted and effective. In some other embodiments, the first type of information can also be stored and reported by the terminal device 120 in response to any other fulfilled triggering condition.

In some embodiments, the first type of information can include an indication of a consistent LBT failure. Therefore, upon receiving the successful handover report provided by the terminal device 120, the source network device 110 can obtain the indication of the consistent LBT failure from the successful handover report. Accordingly, the source network device 110 may optimize a future handover of a terminal device initiated in the cell 115 to avoid a consistent LBT failure related to the terminal device.

Additionally or alternatively, the first type of information may include information on one or more bandwidth parts (BWP) in which the consistent LBT failure is triggered. Therefore, upon receiving the successful handover report provided by the terminal device 120, the network device 110 can obtain the BWP information related to the consistent LBT failure from the successful handover report. Accordingly, the network device 110 may optimize a future handover of a terminal device initiated in the cell 115 to avoid a consistent LBT failure in these BWPs.

Additionally or alternatively, the first type of information can include BWPs in sequence in which a consistent LBT failure recovery has been performed. Therefore, upon receiving the successful handover report provided by the terminal device 120, the network device 110 can determine the ordered BWPs related to the consistent LBT failure recovery from the successful handover report. Accordingly, the network device 110 may optimize a future handover of a terminal device initiated in the cell 115 to avoid a consistent LBT failure in these BWPs.

Additionally or alternatively, the first type of information may include a value of a counter for counting the number of LBT failures. Therefore, upon receiving the successful handover report provided by the terminal device 120, the network device 110 can determine the value of the counter from the successful handover report. Accordingly, the network device 110 can determine the severity of the LBT failures when the handover is performed, for example, how many times the LBT has failed, and thus can evaluate the degree of congestion in the unlicensed bands. On this basis, the network device 110 can optimize the use of the licensed bands, for example, allocating to a terminal device less BWPs in which LBT failures occurred. In some embodiments, the counter for counting the number of LBT failures may be the LBT_COUNTER as defined in related 3GPP specifications.

Additionally or alternatively, the first type of information can include a value of a timer for consistent LBT failure detection. Therefore, upon receiving the successful handover report provided by the terminal device 120, the network device 110 can obtain the value of the timer from the successful handover report. Accordingly, the network device 110 can determine the severity of the LBT failures when the handover is performed, for example, how long has it been since the last LBT failure, and thus can evaluate the degree of congestion in the unlicensed bands. On this basis, the network device 110 can optimize the use of the licensed bands, for example, allocating to a terminal device less BWPs in which LBT failures occurred. In some embodiments, the timer may be lbt-FailureDetectionTimer as defined in related 3GPP specifications.

As another example, for the purpose of the successful handover report, the terminal device 120 can collect a second type of information related to a MCG link recovery associated with the terminal device. In general, the second type of information may be any suitable information of the MCG link recovery that can reflect problems in the MCG link recovery. For example, the terminal device 120 may store the MCG RLF related information in the successful handover report. Accordingly, in case of successful MCG recovery by handover, the MCG failure information can be reported by the terminal device 120 to the network, which can enable the network to analyze and improve the performance of the fast MCG recovery.

In some embodiments, the second type of information can be stored and reported by the terminal device 120 in the successful handover report, if one or more triggering conditions of the second type are satisfied before or during the handover of the terminal device 120. In other words, if the terminal device 120 detects a fulfilled triggering condition related to the fast MCG link recovery before or during the handover, then the terminal device 120 may collect the information related to the fast MCG link recovery to be included in the successful handover report. In this way, the information collected by the terminal device 120 for the successful handover report can be more targeted and effective. In some other embodiments, the second type of information can also be stored and reported by the terminal device 120 in response to any other fulfilled triggering condition.

In some embodiments, the second type of information can include the duration since an MCG RLF is detected until the handover is completed, namely, the time elapsed since the MCG connection failure until the handover succeeded, which may represent the interruption time of the on-going service of MCG. Therefore, upon receiving the successful handover report provided by the terminal device 120, the network device 110 can obtain the duration from the successful handover report. Accordingly, the network device 110 may analyze the performance of the fast MCG recovery through handover and determine if any optimization on the fast MCG recovery is needed.

Additionally or alternatively, the second type of information may include a value of a timer representing the duration of the MCG link recovery, for example, the value of T316 timer when it is stopped, which may represent for how long the recover procedure takes. Therefore, upon receiving the successful handover report provided by the terminal device 120, the network device 110 can obtain the value of the timer from the successful handover report. Accordingly, the network device 110 may analyze the performance of the fast MCG recovery through handover and determine if any optimization on the fast MCG recovery configuration is needed.

Additionally or alternatively, the second type of information can include an indication of an MCG RLF or a RLF report of the MCG. For example, the terminal device 120 can store all or part information in the stored RLF-report variable to the successful handover report variable and then clear the RLF-report variable. Therefore, upon receiving the successful handover report provided by the terminal device 120, the network device 110 can obtain the indication of the MCG RLF or the RLF report of the MCG from the successful handover report. Accordingly, the network device 110 may optimize a future handover of a terminal device initiated in the cell 115 to avoid an MCG RLF.

Additionally or alternatively, the second type of information can include an indication as to whether SRB3 or an SCG link of split SRB1 is used in the MCG link recovery. Therefore, upon receiving the successful handover report provided by the terminal device 120, the network device 110 can obtain the indication from the successful handover report. Accordingly, the network device 110 may optimize a future handover of a terminal device initiated in the cell 115 to improve the configurations of the SRB3 and the split SRB1.

As a further example, for the purpose of the successful handover report, the terminal device 120 can collect a third type of information related to an RLF on the source cell 115 during the handover if the handover is a DAPS handover. In other words, the terminal device 120 can store source RLF related information in the successful handover report. In this way, the service interruption during the DAPS handover can be reported to the network to enable the network to analyze and enhance the performance of the DAPS handover.

In some embodiments, the third type of information can be stored and reported by the terminal device 120 in the successful handover report, if one or more triggering conditions of the third type are satisfied before or during the handover of the terminal device 120. In other words, if the terminal device 120 detects a fulfilled triggering condition related to the DAPS handover before or during the handover, then the terminal device 120 may collect the information related to the DAPS handover to be included in the successful handover report. In this way, the information collected by the terminal device 120 for the successful handover report can be more targeted and effective. In some other embodiments, the third type of information can also be stored and reported by the terminal device 120 in response to any other fulfilled triggering condition.

In some embodiments, the third type of information can include the duration since the RLF on the source cell 115 is detected until the DAPS handover is completed, namely, the time elapsed since the source RLF until DAPS handover success, which can represent the service interruption during DAPS handover. Therefore, upon receiving the successful handover report provided by the terminal device 120, the network device 110 can obtain the duration from the successful handover report. Accordingly, the network device 110 may optimize a future DAPS handover of a terminal device initiated in the cell 115 to shorten the duration since the RLF on the source cell 115 is detected until the DAPS handover is completed.

As another example, for the purpose of the successful handover report, the terminal device 120 can collect a fourth type of information if the handover is a conditional handover. In general, the fourth type of information may be any suitable information of the conditional handover that can reflect problems in the conditional handover. Using the information of the conditional handover contained in the successful handover report provided by the terminal device 120, the source network device 110 can optimize the configurations of the conditional handover. For example, the source network device 110 may avoid configuring the CHO candidate cells with low signal strength and/or can avoid configuring the execution conditions not triggered.

In some embodiments, the fourth type of information can be stored and reported by the terminal device 120 in the successful handover report, if one or more triggering conditions of the fourth type are satisfied before or during the handover of the terminal device 120. In other words, if the terminal device 120 detects a fulfilled triggering condition related to the conditional handover before or during the handover, then the terminal device 120 may collect the information related to the conditional handover to be included in the successful handover report. In this way, the information collected by the terminal device 120 for the successful handover report can be more targeted and effective. In some other embodiments, the fourth type of information can also be stored and reported by the terminal device 120 in response to any other fulfilled triggering condition.

In some embodiments, the fourth type of information can include identifiers of multiple CHO candidate cells including the target cell 135. Therefore, upon receiving the successful handover report provided by the terminal device 120, the network device 110 can obtain the identifiers of multiple CHO candidate cells from the successful handover report. Accordingly, the network device 110 may optimize a future conditional handover of a terminal device initiated in the cell 115 to improve the configurations of the CHO candidate cells.

Additionally or alternatively, the fourth type of information may include measurement results of the multiple CHO candidate cells. Therefore, upon receiving the successful handover report provided by the terminal device 120, the network device 110 can obtain the measurement results of the multiple CHO candidate cells from the successful handover report. Accordingly, the network device 110 may optimize a future conditional handover of a terminal device initiated in the cell 115 to improve the configurations of the CHO candidate cells.

Additionally or alternatively, the fourth type of information may include execution conditions of the multiple CHO candidate cells. Therefore, upon receiving the successful handover report provided by the terminal device 120, the network device 110 can obtain the execution conditions of the multiple CHO candidate cells from the successful handover report. Accordingly, the network device 110 may optimize a future conditional handover of a terminal device initiated in the cell 115 to improve the configurations of the execution conditions of the multiple CHO candidate cells.

Additionally or alternatively, the fourth type of information can include a fulfilled execution condition of the target cell 135, for example, a measId, an Event ID, a trigger threshold, a trigger offset, a hysteresis value, a timToTrigger value, or the like. Therefore, upon receiving the successful handover report provided by the terminal device 120, the network device 110 can obtain the fulfilled execution condition from the successful handover report. Accordingly, the network device 110 may optimize a future conditional handover of a terminal device initiated in the cell 115 to improve the configurations of the execution conditions of the multiple CHO candidate cells.

As a further example, for the purpose of the successful handover report, the terminal device 120 can collect a fifth type of information related to time information of the handover. Through the time information of the handover in the successful handover report provided by the terminal device 120, the network can identify the time of the handover event corresponding to successful handover report and can thus obtain the time information of the successful handover event, so as to improve the configurations of future handovers.

Figure 4:
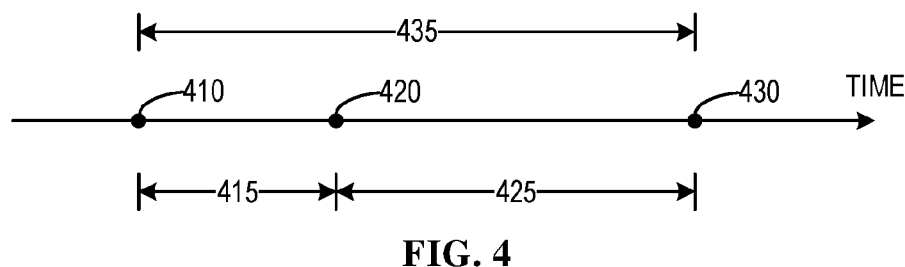
FIG. 4 illustrates a schematic diagram showing several time points and durations related to a handover of a terminal device, in accordance with some embodiments of the present disclosure.

FIG. 4 illustrates a schematic diagram showing several time points 410, 420 and 430 and durations 415, 425, and 435 related to the handover of the terminal device 120, in accordance with some embodiments of the present disclosure. Referring to both FIGS. 1A and 4, the time point 410 may represent the time point when the handover of the terminal device 120 from the cell 115 to the cell 135 is initiated. The time point 420 may represent the time point when the handover of the terminal device 120 from the cell 115 to the cell 135 is completed. The time point 420 may represent the time point when the successful handover report of the handover is transmitted to the target network device 130 or another network device.

Accordingly, the duration 415 may represent the duration of performing the handover, namely, the value of the timer T304 as defined in the related 3GPP specifications. The duration 425 may represent the duration since the handover is completed until the successful handover report is transmitted to the target network device 130 or the further network device, namely, the time elapsed since the handover succeeded until the successful handover report of the handover is fetched. The duration 435 may represent the duration since the handover is initiated until the successful handover report is transmitted to the target network device 130 or a further network device, that is, the time elapsed since the handover is initiated until the successful handover report of the handover is fetched.

In some embodiments, the fifth type of information may include the duration 435 since the handover is initiated until the successful handover report is transmitted to the target network device 130 or a further network device. Additionally or alternatively, the fifth type of information may include the duration 425 since the handover is completed until the successful handover report is transmitted to the target network device 130 or the further network device. For example, when the terminal device 120 receives UEInformationRequest for requesting the successful handover report, the terminal device 120 can store the time elapsed since the handover initiation or the time elapsed since the handover succeeded (for example, to build up time line of the handover event) in the successful handover report to be reported. Then the terminal device 120 may provide the successful handover report to the network by UEInformationResponse.

In some embodiments, instead of reporting the durations 415, 425 and/or 435, the terminal device 120 may store and report the absolute time information as to when the handover is initiated or succeeded. For example, the fifth type of information may include a time point 410 when the handover is initiated. Additionally or alternatively, the fifth type of information may include a time point 420 when the handover is completed.

As a further example, for the purpose of the successful handover report, the terminal device 120 can collect an identifier of the terminal device 120 in the source cell 115. For example, the identifier may be a Cell Radio Network Temporary Identifier (C-RNTI). Therefore, upon receiving the successful handover report provided by the terminal device 120, the network device 110 can obtain the identifier of the terminal device 120 from the successful handover report. Accordingly, the network device 110 may optimize a future handover of a terminal device initiated in the cell 115 based on the configurations of the terminal device 120.

Hereinbefore, some embodiments are described in which a terminal device can be configured with various triggering conditions for a successful handover report and various types of information to be reported in the successful handover report. Hereinafter, some other embodiments will be described in which a successful handover report can be supported for an inter-RAT handover of a terminal device.

It is noted that a conventional successful handover report can only be supported for an intra-RAT handover. However, the inventor(s) identified that the inter-RAT handover performance can also achieve the same benefit by supporting successful handover reports. Accordingly, some embodiments of the present disclosure support a successful handover report for an inter-RAT handover, for example, a handover from the NR to the LTE. More details of a successful handover report for an inter-RAT handover are discussed below with reference to FIG. 1A.

Referring back to FIG. 1A, it is assumed that the handover of the terminal device 120 from the cell 115 to the cell 135 is an inter-RAT handover, in which the source cell 115 may be based on a first RAT and the target cell 135 may be based on a second RAT different from the first RAT. In general, the first and second RATs can be any two different RATs among the existing RATs or the RATs to be developed in the future.

In some embodiments, the first RAT can be the NR and the second RAT can be the LTE. As such, the inter-RAT successful handover report can be supported for network devices base on the most two dominant RATs. In these embodiments, upon receiving mobilityFromNRCommand, the terminal device 120 may check the set of triggering conditions 125 for a successful handover report. If one or more of the set of triggering conditions 125 are fulfilled, the terminal device 120 can store the content of the successful handover report in the successful handover report variable. The triggering conditions for the successful handover report and the content to be contained in the successful handover report can be the same or similar to that described above. In addition, if the successful handover report is triggered for the handover, the terminal device 120 may collect a cell identification of the target cell 135 to be reported in the successful handover report. The cell identification can indicate that the handover is an inter-RAT handover and may include a cell global identifier (CGI) and an associated tracking area code (TAC). In this way, an inter-RAT successful handover report can be implicitly indicated by the cell identification in the LTE. For example, the CGI may be an E-UTRA CGI of the terminal device 120.

In some embodiments, the source network device 110 can determine configuration information as to whether an inter-RAT successful handover report is supported. Then, the source network device 110 may transmit the configuration information to the terminal device 120. In this way, the network device 110 can flexibly control the configuration of the inter-RAT successful handover report in the cell 115. In these embodiments, with reference back to FIG. 2, in determining (230) the triggering information on the successful handover report, if the terminal device 120 receives configuration information from the source network device 110 and the configuration information indicates that the successful handover report is supported for the inter-RAT handover, then the terminal device 120 may further determine the triggering information, namely, whether the successful handover report is triggered. For example, the configuration information may be transmitted from the source network device 110 to the terminal device 120 via system information of the source cell 115. As such, the configuration information can be more available for a terminal device in the cell 115. Alternatively or additionally, the configuration information may be transmitted via a handover command message that causes the terminal device 120 to perform the handover. In this way, the configuration information can be specifically determined for a specific terminal device or a specific handover.

In some embodiments, the configuration information can be common to the set of triggering conditions 125. In other words, one inter-RAT successful handover report may be configured on top of all the triggering conditions. In this way, the configuration of the triggering conditions for the inter-RAT successful handover report may be simplified. Alternatively, the configuration information may be specific to one of the set of triggering conditions 125. That is, the inter-RAT successful handover report can be configured for each triggering condition. As such, the inter-RAT successful handover report can be flexibly and selectively generated for one or more of the set of triggering conditions 125.

Figure 5:
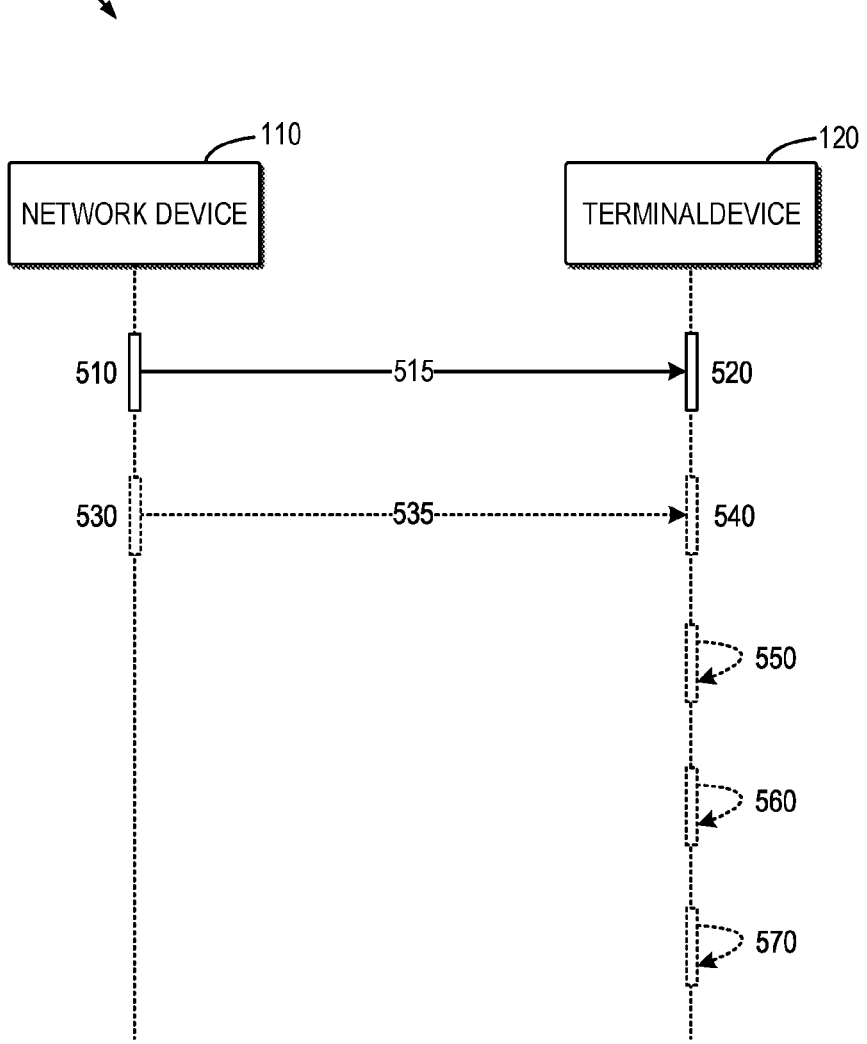
FIG. 5 illustrates another example communication process between a network device and a terminal device in accordance with some embodiments of the present disclosure.

FIG. 5 illustrates another example communication process 500 between the network device 110 and the terminal device 120 in accordance with some embodiments of the present disclosure. In the example communication process 500, the network device 110 may first transmit (510) the configuration information via system information 515 of the cell 115 to the terminal device 120. In this way, when the terminal device 120 receives (520) the system information 515 on the source cell 115, the terminal device 120 can obtain the configuration information from the system information 515. If the configuration information indicates that the successful handover report is supported for the inter-RAT handover and the network device 110 transmits (530) an indication 535 of the inter-RAT handover, then the terminal device 120 can determine (550) the triggering information of the inter-RAT handover after receiving (540) the indication 535.

Further, if the terminal device 120 determines that the successful handover report is triggered for the inter-RAT handover, then the terminal device 120 can collect (560) information to be reported in the successful handover report. Otherwise, if the terminal device 120 determines that the successful handover report is not triggered for the inter-RAT handover, then the terminal device 120 can avoid (570) collecting information to be reported in the successful handover report. On the other hand, if the configuration information indicates that the successful handover report is not supported for the inter-RAT handover, then the terminal device 120 can avoid generating the successful handover report without further determining the triggering information.

Figure 6:
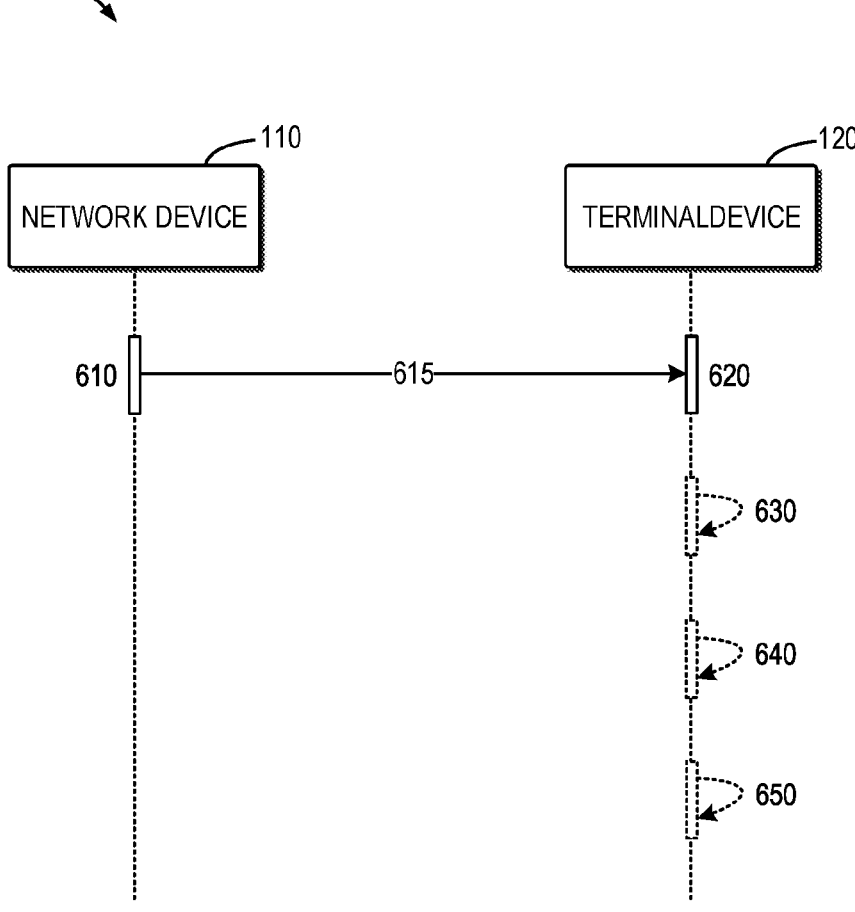
FIG. 6 illustrates a further example communication process between a network device and a terminal device in accordance with some embodiments of the present disclosure.

FIG. 6 illustrates a further example communication process 600 between the network device 110 and the terminal device 120 in accordance with some embodiments of the present disclosure. In the example communication process 600, the network device 110 may transmit (610) the configuration information via a handover command message 615 to the terminal device 120. In this way, when the terminal device 120 receives (620) the handover command message 615, the terminal device 120 can obtain the configuration information from the handover command message 615. If the configuration information indicates that the successful handover report is supported for the inter-RAT handover, then the terminal device 120 can determine (630) the triggering information of the inter-RAT handover.

Further, if the terminal device 120 determines that the successful handover report is triggered for the inter-RAT handover, then the terminal device 120 can collect (640) information to be reported in the successful handover report. Otherwise, if the terminal device 120 determines that the successful handover report is not triggered for the inter-RAT handover, then the terminal device 120 can avoid (650) collecting information to be reported in the successful handover report. On the other hand, if the configuration information indicates that the successful handover report is not supported for the inter-RAT handover, then the terminal device 120 can avoid generating the successful handover report without further determining the triggering information.

FIG. 7 illustrates a flowchart of an example method 700 in accordance with some embodiments of the present disclosure. In some embodiments, the method 700 can be implemented at a terminal device, such as the terminal device 120 as shown in FIGS. 1A, 1B and 3. Additionally or alternatively, the method 700 can also be implemented at other terminal devices not shown in FIGS. 1A, 1B and 3. For the purpose of discussion, the method 700 will be described with reference to FIGS. 1A, 1B and 3 as being performed by the terminal device 120 without loss of generality.

At block 710, the terminal device 120 receives, from the first network device 110 providing the first cell 115, an indication that a handover of the terminal device 120 from the first cell 115 to the second cell 135 of the second network device 130 is to be performed. At block 720, the terminal device 120 determines triggering information about a successful handover report of the handover based on a set of triggering conditions, the triggering information indicating whether the successful handover report is triggered for the handover.

In some embodiments, the set of triggering conditions may comprise at least one of the following: a first type of triggering conditions related to a LBT process performed by the terminal device 120, a second type of triggering conditions related to a fast MCG link recovery associated with the terminal device 120, a third type of triggering conditions if the handover is a DAPS handover, and a fourth type of triggering conditions if the handover is a CHO.

In some embodiments, the first type of triggering conditions may comprise at least one of the following: a consistent LBT failure in the LBT process is triggered and not canceled; and a LBT counter for counting the number of LBT failures in the LBT process is greater than a predetermined threshold.

In some embodiments, the first network device 110 is a master network device of the terminal device 120, a third network device 150 is a secondary network device of the terminal device 120, and the second type of triggering conditions may comprise: the terminal device 120 receives, via a SCG provided by the secondary network device, a RRC reconfiguration message containing the indication, the RRC reconfiguration message being in response to MCG failure information transmitted by the terminal device 120 via the SCG to the master network device providing an MCG including the first cell 115, the MCG failure information indicating an MCG RLF.

In some embodiments, the third type of triggering conditions may comprise: an RLF on the first cell 115 is detected by the terminal device 120.

In some embodiments, the fourth type of triggering conditions may comprise at least one of the following: a plurality of CHO candidate cells including the second cell 135 are configured; and a plurality of execution conditions are configured for the second cell 135.

In some embodiments, if the successful handover report is triggered for the handover, the terminal device 120 can collect information to be reported in the successful handover report.

In some embodiments, if the successful handover report is not triggered for the handover, the terminal device 120 can avoid collecting information for the successful handover report.

In some embodiments, the information may comprise at least one of the following: a first type of information related to a LBT process performed by the terminal device 120, a second type of information related to a MCG link recovery associated with the terminal device 120, a third type of information related to an RLF on the first cell 115 during the handover if the handover is a DAPS handover, a fourth type of information if the handover is a CHO, and a fifth type of information related to time information of the handover.

In some embodiments, the information may comprise an identifier of the terminal device 120 in the first cell 115.

In some embodiments, the first type of information may comprise at least one of the following: an indication of a consistent LBT failure, information on one or more BWPs in which the consistent LBT failure is triggered, BWPs in sequence in which a consistent LBT failure recovery has been performed, a value of a counter for counting the number of LBT failures, and a value of a timer for consistent LBT failure detection.

In some embodiments, the second type of information may comprise at least one of the following: a duration since an MCG RLF is detected until the handover is completed, a value of a timer representing a duration of the MCG link recovery, an indication of an MCG RLF, an RLF report of the MCG, and an indication as to whether SRB3 or an SCG link of split SRB1 is used in the MCG link recovery.

In some embodiments, the third type of information may comprise: a duration since the RLF on the first cell 115 is detected until the DAPS handover is completed.

In some embodiments, the fourth type of information may comprise at least one of the following: identifiers of a plurality of CHO candidate cells including the second cell, measurement results of the plurality of CHO candidate cells, execution conditions of the plurality of CHO candidate cells, and a fulfilled execution condition of the second cell 135.

In some embodiments, the fifth type of information may comprise at least one of the following: a duration since the handover is initiated until the successful handover report is transmitted to the second network device 130 or a further network device, a duration since the handover is completed until the successful handover report is transmitted to the second network device 130 or the further network device, a time point when the handover is initiated, and a time point when the handover is completed.

In some embodiments, the first cell 115 may be based on a first RAT and the second cell 135 may be based on a second RAT different from the first RAT.

In some embodiments, the second RAT may be the LTE and if the successful handover report is triggered for the handover, the terminal device 120 can collect a cell identification of the second cell 135 to be reported in the successful handover report. The cell identification may include a CGI and an associated TAC.

In some embodiments, when determining the triggering information, if the terminal device 120 receives, from the first network device 110, configuration information indicating that the successful handover report is supported for the handover as an inter-RAT handover, the terminal device 120 can determine the triggering information.

In some embodiments, the configuration information may be carried in system information of the first cell 115, and/or a handover command message causing the terminal device 120 to perform the handover.

In some embodiments, the configuration information may be common to the set of triggering conditions. Alternatively, in some embodiments, the configuration information may be specific to one of the set of triggering conditions.

FIG. 8 illustrates a flowchart of another example method 800 in accordance with some embodiments of the present disclosure. In some embodiments, the method 800 can be implemented at a network device, such as the network device 110 as shown in FIGS. 1A, 1B and 3. Additionally or alternatively, the method 800 can also be implemented at other terminal devices not shown in FIGS. 1A, 1B and 3. For the purpose of discussion, the method 800 will be described with reference to FIGS. 1A, 1B and 3 as being performed by the network device 110 without loss of generality.

At block 810, the network device 110 transmits, to the terminal device 120, configuration information indicating whether a successful handover report is supported for an inter-RAT handover of the terminal device 120 from the first cell 115 to the second cell 135, the first cell 115 is provided by the network device 110 based on a first RAT, and the second cell is based on a second RAT different from the first RAT.

In some embodiments, the configuration information may be carried in at least one of the following: system information of the first cell, and a handover command message causing the terminal device to perform the inter-RAT handover.

In some embodiments, the configuration information may be common to a set of triggering conditions for triggering the successful handover report. Alternatively, in some embodiments, the configuration information may be specific to a triggering condition for triggering the successful handover report.

According to embodiments of the present disclosure, a terminal device comprises circuitry configured to: receive, from a first network device providing a first cell, an indication that a handover of the terminal device from the first cell to a second cell of a second network device is to be performed; and determine triggering information about a successful handover report of the handover based on a set of triggering conditions, the triggering information indicating whether the successful handover report is triggered for the handover.

In some embodiments, the set of triggering conditions may comprise at least one of the following: a first type of triggering conditions related to a LBT process performed by the terminal device 120, a second type of triggering conditions related to a fast MCG link recovery associated with the terminal device 120, a third type of triggering conditions if the handover is a DAPS handover, and a fourth type of triggering conditions if the handover is a CHO.

In some embodiments, the first type of triggering conditions may comprise at least one of the following: a consistent LBT failure in the LBT process is triggered and not canceled; and a LBT counter for counting the number of LBT failures in the LBT process is greater than a predetermined threshold.

In some embodiments, the first network device 110 is a master network device of the terminal device 120, a third network device 150 is a secondary network device of the terminal device 120, and the second type of triggering conditions may comprise: the terminal device 120 receives, via a SCG provided by the secondary network device, a RRC reconfiguration message containing the indication, the RRC reconfiguration message being in response to MCG failure information transmitted by the terminal device 120 via the SCG to the master network device providing an MCG including the first cell 115, the MCG failure information indicating an MCG RLF.

In some embodiments, the third type of triggering conditions may comprise: an RLF on the first cell 115 is detected by the terminal device 120.

In some embodiments, the fourth type of triggering conditions may comprise at least one of the following: a plurality of CHO candidate cells including the second cell 135 are configured; and a plurality of execution conditions are configured for the second cell 135.

In some embodiments, the circuitry is further configured to: if the successful handover report is triggered for the handover, collect information to be reported in the successful handover report.

In some embodiments, the circuitry is further configured to: if the successful handover report is not triggered for the handover, avoid collecting information for the successful handover report.

In some embodiments, the information may comprise at least one of the following: a first type of information related to a LBT process performed by the terminal device 120, a second type of information related to a MCG link recovery associated with the terminal device 120, a third type of information related to an RLF on the first cell 115 during the handover if the handover is a DAPS handover, a fourth type of information if the handover is a CHO, and a fifth type of information related to time information of the handover.

In some embodiments, the information may comprise an identifier of the terminal device 120 in the first cell 115.

In some embodiments, the first type of information may comprise at least one of the following: an indication of a consistent LBT failure, information on one or more BWPs in which the consistent LBT failure is triggered, BWPs in sequence in which a consistent LBT failure recovery has been performed, a value of a counter for counting the number of LBT failures, and a value of a timer for consistent LBT failure detection.

In some embodiments, the second type of information may comprise at least one of the following: a duration since an MCG RLF is detected until the handover is completed, a value of a timer representing a duration of the MCG link recovery, an indication of an MCG RLF, an RLF report of the MCG, and an indication as to whether SRB3 or an SCG link of split SRB1 is used in the MCG link recovery.

In some embodiments, the third type of information may comprise: a duration since the RLF on the first cell 115 is detected until the DAPS handover is completed.

In some embodiments, the fourth type of information may comprise at least one of the following: identifiers of a plurality of CHO candidate cells including the second cell, measurement results of the plurality of CHO candidate cells, execution conditions of the plurality of CHO candidate cells, and a fulfilled execution condition of the second cell 135.

In some embodiments, the fifth type of information may comprise at least one of the following: a duration since the handover is initiated until the successful handover report is transmitted to the second network device 130 or a further network device, a duration since the handover is completed until the successful handover report is transmitted to the second network device 130 or the further network device, a time point when the handover is initiated, and a time point when the handover is completed.

In some embodiments, the first cell 115 may be based on a first RAT and the second cell 135 may be based on a second RAT different from the first RAT.

In some embodiments, the second RAT may be the LTE and the circuitry is further configured to: if the successful handover report is triggered for the handover, collect a cell identification of the second cell 135 to be reported in the successful handover report. The cell identification may include a CGI and an associated TAC.

In some embodiments, the circuitry is further configured to determine the triggering information if the terminal device 120 receives, from the first network device 110, configuration information indicating that the successful handover report is supported for the handover as an inter-RAT handover.

In some embodiments, the configuration information may be carried in system information of the first cell 115, and/or a handover command message causing the terminal device 120 to perform the handover.

In some embodiments, the configuration information may be common to the set of triggering conditions. Alternatively, in some embodiments, the configuration information may be specific to one of the set of triggering conditions.

According to embodiments of the present disclosure, a network device comprises circuitry configured to transmit, to a terminal device, configuration information indicating whether a successful handover report is supported for an inter-RAT handover of the terminal device from a first cell to a second cell. The first cell is provided by the network device based on a first RAT, and the second cell is based on a second RAT different from the first RAT.

In some embodiments, the configuration information may be carried in at least one of the following: system information of the first cell, and a handover command message causing the terminal device to perform the inter-RAT handover.

In some embodiments, the configuration information may be common to a set of triggering conditions for triggering the successful handover report. Alternatively, in some embodiments, the configuration information may be specific to a triggering condition for triggering the successful handover report.

Figure 9:
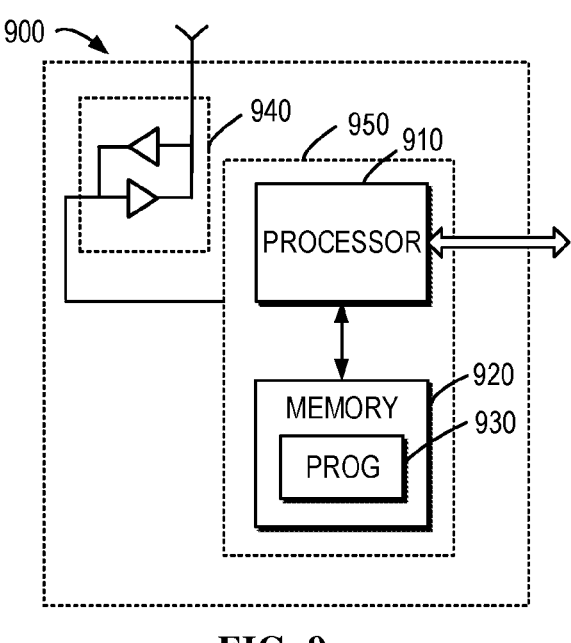
FIG. 9 illustrates a simplified block diagram of a device that is suitable for implementing some embodiments of the present disclosure.

FIG. 9 is a simplified block diagram of a device 900 that is suitable for implementing some embodiments of the present disclosure. The device 900 can be considered as a further embodiment of the network device 110 and the terminal device 120 as shown in FIG. 1. Accordingly, the device 900 can be implemented at or as at least a part of the network device 110 and the terminal device 120.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 920 stores at least a part of a program 930. The TX/RX 940 is for bidirectional communications. The TX/RX 940 has at least one antenna to facilitate communication, though in practice an Access Node mentioned in this application may have several ones. The communication interface may represent any interface that is necessary for communication with other network elements, such as X2 or Xn interface for bidirectional communications between gNBs or eNBs, S1 interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 930 is assumed to include program instructions that, when executed by the associated processor 910, enable the device 900 to operate in accordance with the embodiments of the present disclosure, as discussed herein with reference to any of FIGS. 14 to 19. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 920 may form processing means 950 adapted to implement various embodiments of the present disclosure.

The memory 920 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 920 is shown in the device 900, there may be several physically distinct memory modules in the device 900. The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In some embodiments, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 and 5 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, comprising:
transmitting a master cell group (MCG) failure information message;
receiving a Radio Resource Control (RRC) reconfiguration message including reconfiguration WithSync; and
storing in a report, time information associated with an MCG recovery procedure and corresponding to a value of a time when a timer T316 is stopped.

2. A method performed by a network device, comprising:
receiving a master cell group (MCG) failure information message;
transmitting a Radio Resource Control (RRC) reconfiguration message including reconfiguration WithSync; and
receiving in a report, time information associated with an MCG recovery procedure and corresponding to a value of a time when a timer T316 is stopped.

3. A terminal device comprising a processor configured to cause the terminal device to:
transmit a master cell group (MCG) failure information message;
receive a Radio Resource Control (RRC) reconfiguration message including reconfigurationWithSync; and
store in a report, time information associated with an MCG recovery procedure and corresponding to a value of a time when a timer T316 is stopped.

4. A network device comprising a processor configured to cause the network device to:
receive a master cell group (MCG) failure information message;
transmit a Radio Resource Control (RRC) reconfiguration message including reconfiguration With Sync; and
receive in a report, time information associated with an MCG recovery procedure and corresponding to a value of a time when a timer T316 is stopped.

* * * * *